United States Patent
Murayama

(10) Patent No.: US 6,519,230 B1
(45) Date of Patent: Feb. 11, 2003

(54) DEVICE FOR TESTING SYNCHRONOUS-TRANSFER-MODE SWITCH

(75) Inventor: Masami Murayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/193,369

(22) Filed: Nov. 17, 1998

(30) Foreign Application Priority Data

May 7, 1998 (JP) ............................................. 10-124691

(51) Int. Cl.[7] .................................................. H04L 1/00
(52) U.S. Cl. ........................ 370/250; 370/248; 370/244; 714/738
(58) Field of Search ................................ 370/241–244, 370/247–251, 360, 370–371, 372–379, 384, 216–228; 379/16, 12; 714/712–717, 724, 735, 738–739, 742, 799, 819–824, 1, 25, 30, 31, 38

(56) References Cited

U.S. PATENT DOCUMENTS

| | | | |
|---|---|---|---|
| 4,858,224 A | * | 8/1989 | Nakano et al. .............. 370/244 |
| 5,313,453 A | * | 5/1994 | Uchida et al. .............. 370/248 |
| 5,349,578 A | * | 9/1994 | Tatsuki et al. .............. 370/244 |
| 5,351,232 A | * | 9/1994 | Yamashita ................... 370/248 |
| 6,215,773 B1 | * | 4/2001 | Karlsson ...................... 370/244 |

FOREIGN PATENT DOCUMENTS

| | | |
|---|---|---|
| JP | 4-291856 | 10/1992 |
| JP | 9-18496 | 1/1997 |
| JP | 9-23230 | 1/1997 |

* cited by examiner

*Primary Examiner*—Steven Nguyen
(74) *Attorney, Agent, or Firm*—Katten Muchin Zavis Rosenman

(57) ABSTRACT

A device for testing a synchronous-transfer-mode switch which is connected to a plurality of input links and a plurality of output links includes a plurality of test data sending blocks each provided for a corresponding one of the input links and each equipped with a function to set test data in a particular time slot of the corresponding one of the input links, thereby allowing the corresponding one of the input links to convey time slots used for a non-test purpose as well as the particular time slot used for a test, and a plurality of test data receiving blocks each provided for a corresponding one of the output links and each equipped with a function to store data of time slots of the corresponding one of the output links when the time slots of the corresponding one of the output links are used for the test.

14 Claims, 18 Drawing Sheets

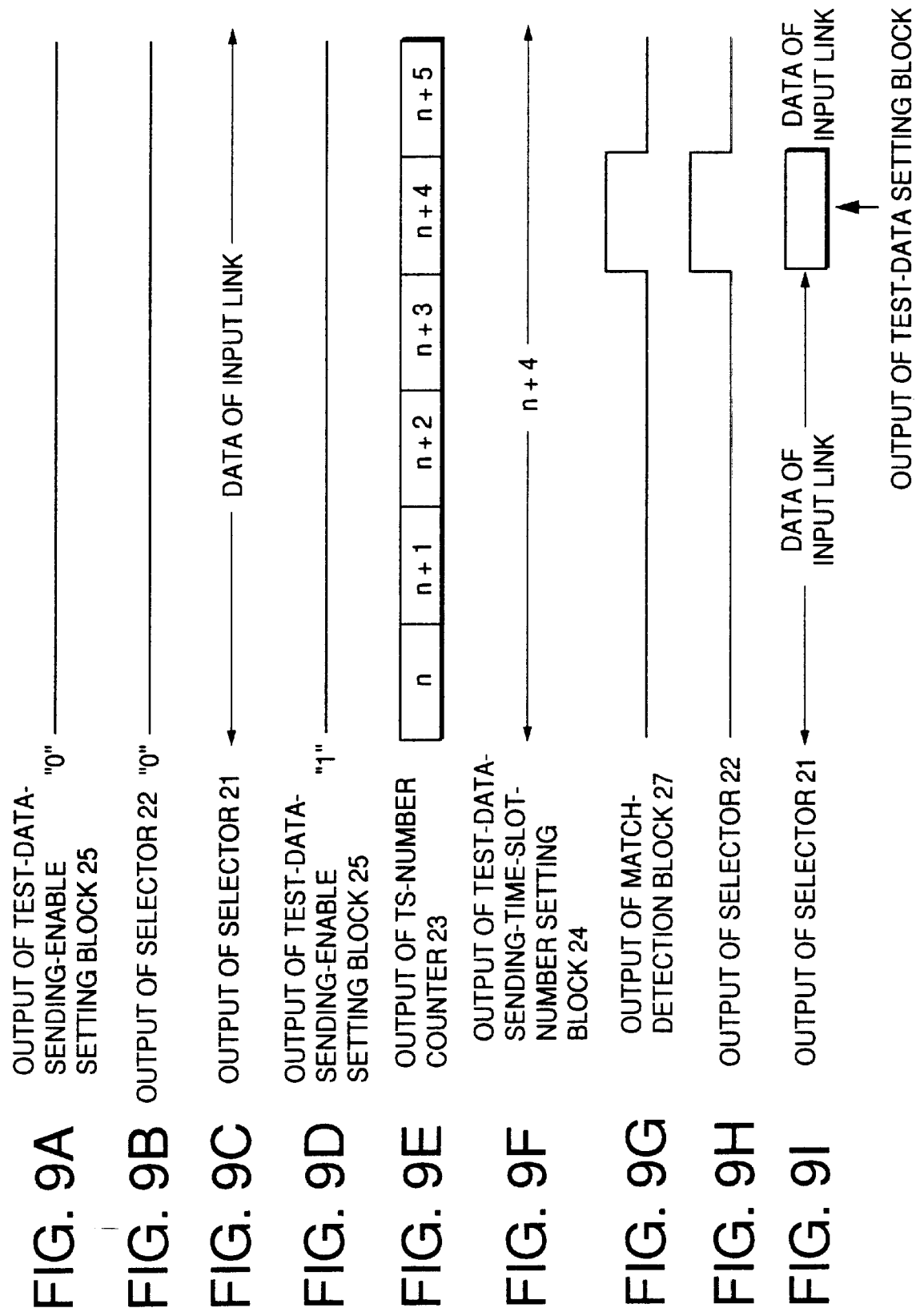

FIG. 10A
CORRESPONDING TO INPUT LINK #0

| TS 0 | USED |
| TS 1 | USED |
| TS 2 | UNUSED |
| TS 3 | USED |
| ..... | ..... |
| TS 1023 | USED |

FIG. 10B
CORRESPONDING TO INPUT LINK #1

| TS 0 | UNUSED |
| TS 1 | USED |
| TS 2 | USED |
| TS 3 | UNUSED |
| ..... | ..... |
| TS 1023 | USED |

FIG. 10C
CORRESPONDING TO INPUT LINK #2

| TS 0 | USED |
| TS 1 | UNUSED |
| TS 2 | UNUSED |
| TS 3 | USED |
| ..... | ..... |
| TS 1023 | UNUSED |

FIG. 10D
CORRESPONDING TO INPUT LINK #3

| TS 0 | USED |
| TS 1 | UNUSED |
| TS 2 | USED |
| TS 3 | USED |
| ..... | ..... |
| TS 1023 | USED |

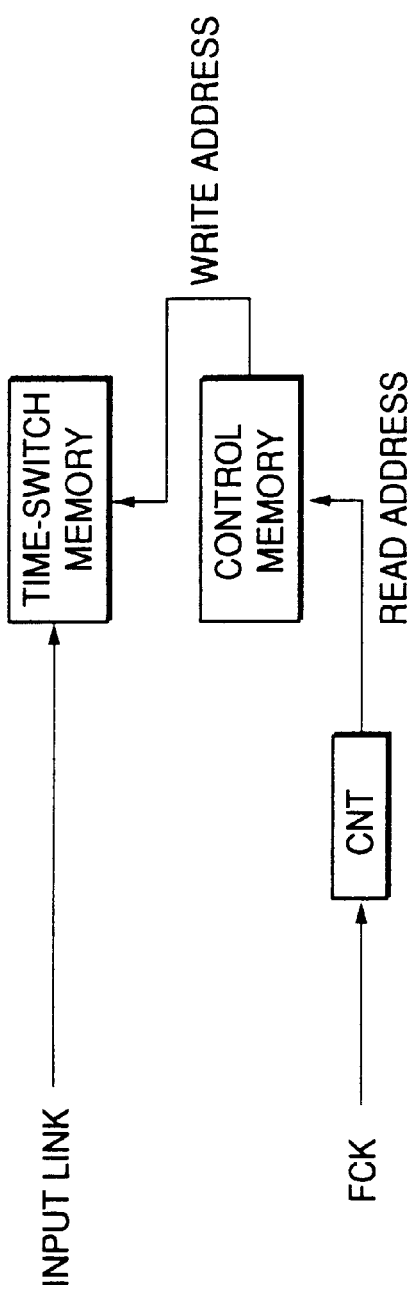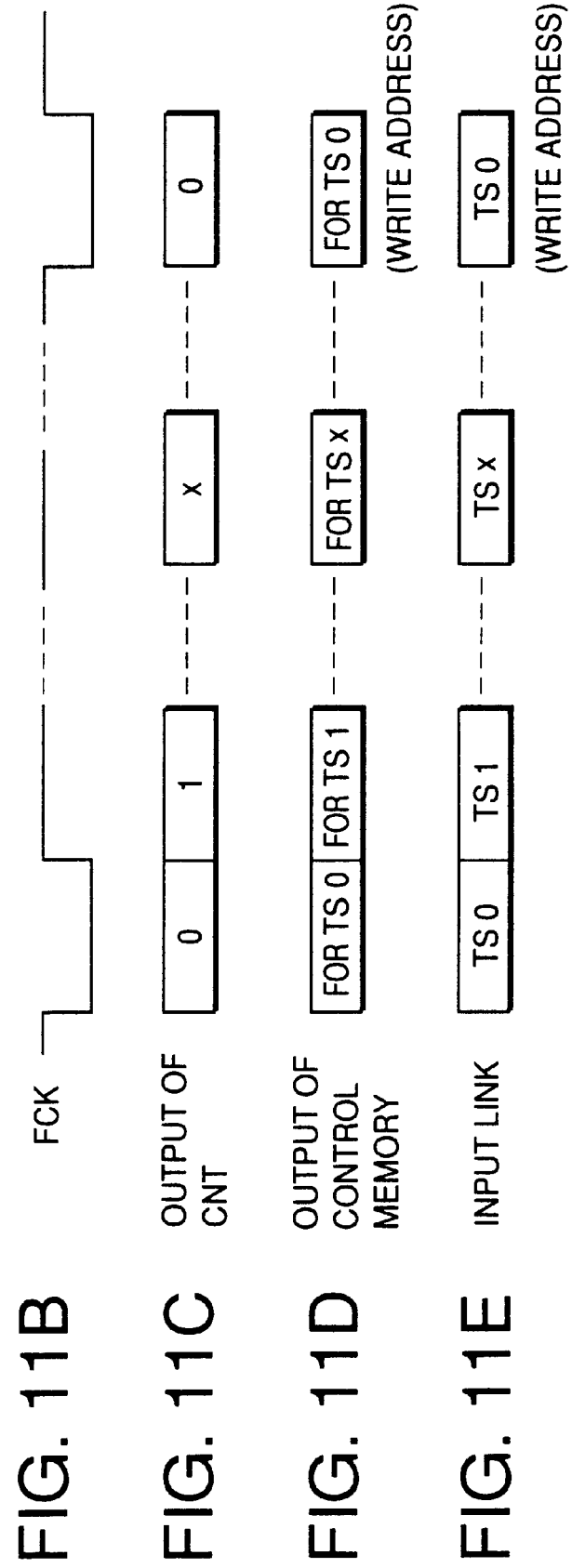
FIG. 11A  FIG. 11B  FIG. 11C  FIG. 11D  FIG. 11E

FIG. 14A  FCK
FIG. 14B  OUTPUT OF TS-NUMBER COUNTER 23
FIG. 14C  OUTPUT OF USED/UNUSED REGISTER 28
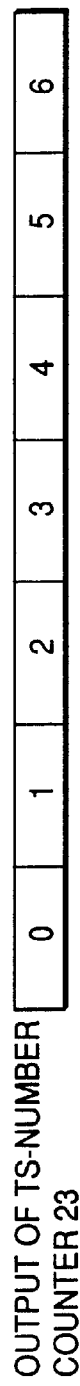
(USED = 0)
FIG. 14D  OUTPUT OF LOWEST-NUMBERED-UNUSED-TS-SELECTION UNIT 29
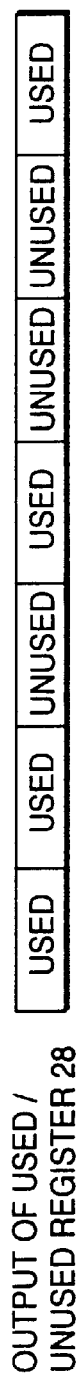
FIG. 14E  OUTPUT OF TEST-DATA-SENDING-ENABLE SETTING BLOCK 26 "1"
FIG. 14F  OUTPUT OF SELECTOR 22
FIG. 14G  OUTPUT OF SELECTOR 21
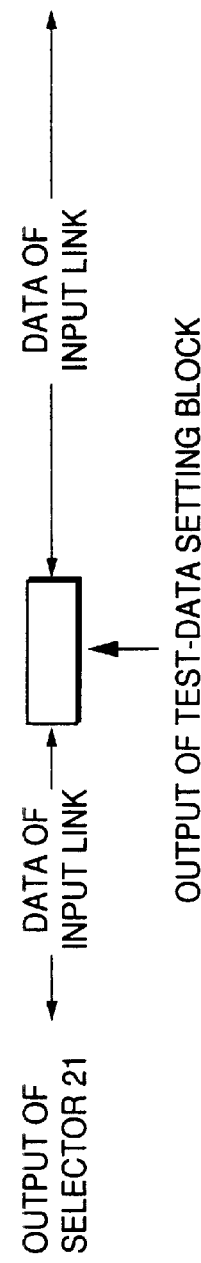
DATA OF INPUT LINK / OUTPUT OF TEST-DATA SETTING BLOCK

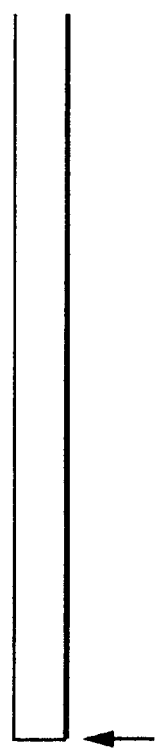
FIG. 17A  FCK
FIG. 17B  OUTPUT OF TS-NUMBER COUNTER 23
| 0 | 1 | 2 | 3 | 4 | 5 | 6 |
FIG. 17C  OUTPUT OF USED / UNUSED REGISTER 32
| USED | USED | UNUSED | USED | UNUSED | UNUSED | USED |
(USED = 0)
FIG. 17D  OUTPUT OF LOWEST-NUMBERED-UNUSED-TS-SELECTION UNIT 33
| USED | USED | UNUSED | USED | USED | USED | USED |
FIG. 17E  TEST-DATA STORING REGISTER 34
← STORING DATA OF TS 2

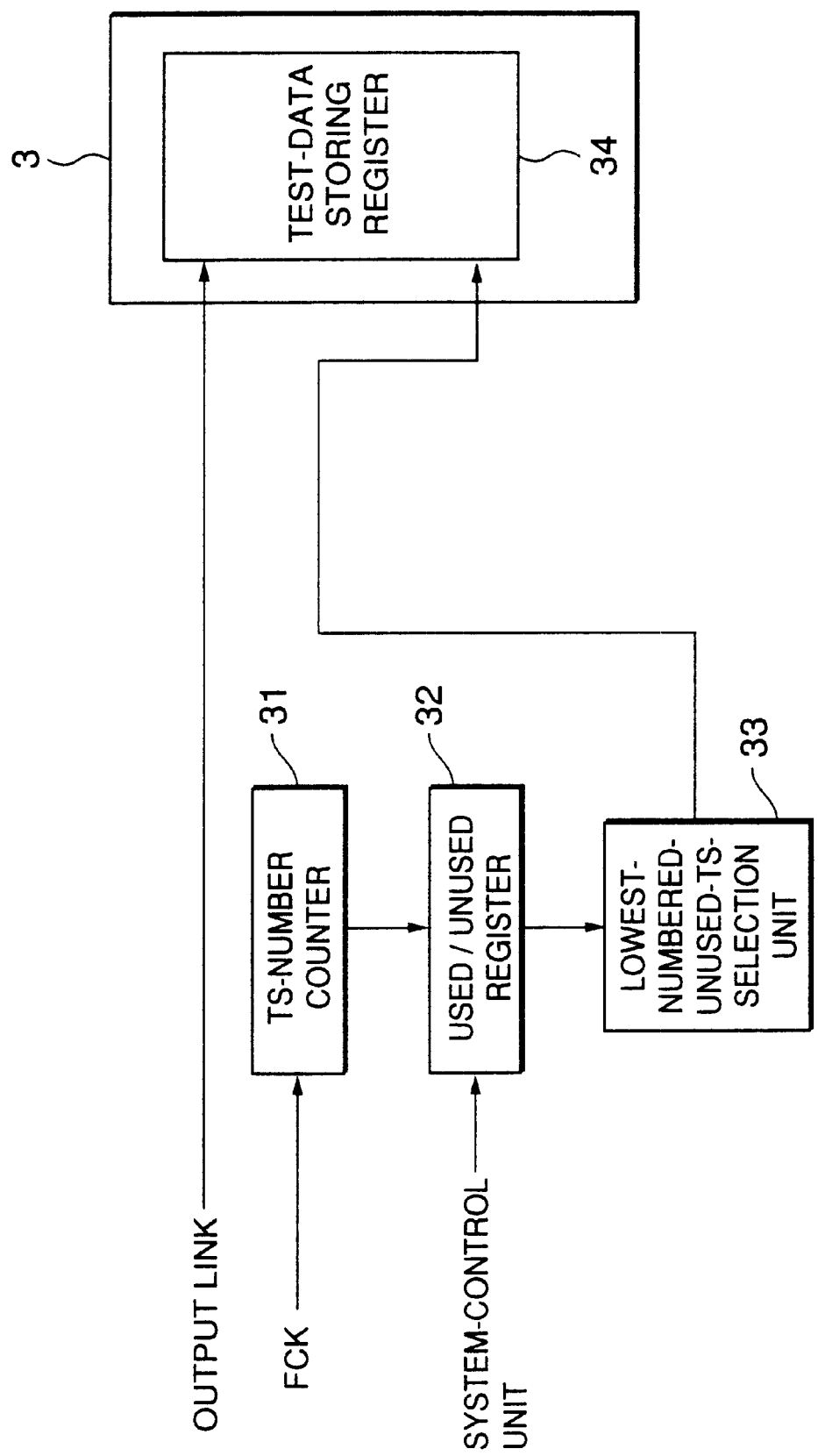

DEVICE FOR TESTING SYNCHRONOUS-TRANSFER-MODE SWITCH

BACKGROUND OF THE INVENTION

1. Field of the Invention

The present invention relates to a testing device which checks operations of a synchronous-transfer-mode switch provided in a switch board.

2. Description of the Related Art

FIG. 1 is an illustrative drawing showing a synchronous-transfer-mode (STM) switch having 4 input links and 4 output links as an example of an STM switch.

As shown in the figure, the STM switch has 4 input links #0 through #3 and 4 output links #0 through #3. Each link has a time-division-multiplexing signal passing therethrough, each frame of which is comprised of 1024 time slots TS0 through TS1023. At the beginning of each frame, a frame clock FCK exhibits a pulse as a frame-synchronization signal.

FIG. 2 is an illustrative drawing showing a configuration of the STM switch of FIG. 1.

As shown in the figure, a plurality of STM switches are provided, each corresponding to a respective one of the output links #0 through #3. Each of the STM switches receives all the input links #0 through #3 on the input side thereof. Each STM switch includes a time-switch memory and a control switch memory. The time-switch memory can store data as much as for 4096 time slots, which corresponds to the number of time slots of all the input links #0 through #3. The control memory can store setting data as much as of 1024 different types, which corresponds to the capacity of the output link (i.e., 1024 time slots). The setting data stored in the control memory is supplied from a system-control unit (now shown) situated on the call-control-system side. In the STM switch of FIG. 2, time switching is conducted by use of the time-switch memory and the control memory. This technology is well within the scope of ordinary skill in the art, and a description thereof will be omitted.

When there is a need to conduct a test with regard to operations of the STM switch, the STM switch may be configured in the manner as shown in FIG. 3. Namely, a test data sending block (TDSB) 2 is provided on the input link #0, and a test data receiving block (TDRB) 3 is provided on the output link #0. Further, a loop-back block 4 is provided for the purpose of feeding back a signal from the output link #3 to the input link #3.

The test data sending block 2, responsive to an instruction from the system-control unit (not shown: comprised of software relating to a call-process system), stores test data in time slots of the input link #0, thereby supplying the test data to an STM switch 1.

The test data receiving block 3 has a capacity to store all the data of all the time slots TS0 through TS1023 supplied from the STM switch 1 to the output link #0. The system-control unit can read data of any time slot stored in the test data receiving block 3.

Further, the loop-back block 4 has a function to connect the output link #3 of the STM switch 1 to the input link #3.

FIG. 4 is an illustrative drawing showing a phase relation between an input link and an output link. As shown in FIG. 4, generally, the input and output of the STM switch 1 have different phases. In this example, a time slot TS0 of the input link has a phase difference of xτ relative to a time slot TS0 of the output link. The loop-back block 4 receives data of all the time slots of the output link #3, and supplies them to the input link #3 after absorbing all the phase differences. As schematically shown in the figure, a time slot TSα of the output link #3 is positioned on the feedback path such that it coincides with the same time slot TSα of the input link #3.

FIG. 5 is an illustrative drawing for explaining a test of switching operations of the STM switch by using the test system of FIG. 3. The following is the test sequence to be followed.

1) The system-control unit instructs the test data sending block 2 to store a test data pattern A in a time slot TSα and supply it to the STM switch 1.

2) The system-control unit instructs the STM switch 1 (to be exact, the control memory in the STM switch 1 corresponding to the output link #3) that the time slot TSα of the input link #0 be supplied as the a time slot TSβ of the output link #3 via switching operations.

3) The system-control unit instructs the STM switch 1 (to be exact, the control memory in the STM switch 1 corresponding to the output link #0) that a time slot TSβ of the input link #3 be supplied as the a time slot TSΓ of the output link #0 via switching operations.

4) Because of the process of 1), the test data sending block 2 supplies the test data pattern A to the STM switch 1 as the time slot TSα of the input link #.

5) Because of the process of 2), the test data pattern A is output from the STM switch 1 as the time slot TSβ of the output link #3.

6) The test data pattern A is then supplied to the loop-back block 4, and is thereafter input to the STM switch 1 as the time slot TSβ of the input link #3.

7) Because of the process of 3), the test data pattern A is output from the STM switch 1 as the time slot TSΓ of the output link #.

8) The test data pattern A is then stored in the test data receiving block 3 of the output link #0 as the time slot TSΓ.

9) The system-control unit instructs the test data receiving block 3 to output the data of the time slot TSΓ.

10) In response to this instruction, the test data receiving block 3 outputs the test data pattern A to the system-control unit.

11) The system control unit compares the test data pattern A obtained at the step 10) with the test data pattern A used at the step 1).

12) If there is a match at the step 11), the test is indicating perfectly normal operations. Otherwise, the test is indicating abnormal operations.

The test of switching operations and the configuration for the test as described above have the following problems.

a) As can be seen from the above description, the test of switching operations can check the connection between the input link #0 to the output link #3 as well as the connection between the input link #3 and the output link #0. However, no test can be conducted with respect to other connections between the input links and the output links.

b) In the related-art test system, each of the test data sending block 2 and the test data receiving block 3 takes up one link (the input link #0 and the output link #0, respectively, in the above example). Another link is used for the loop-back purpose (the input link #3 and the output link #3 in the above example). In this configuration, only two links (the input links #1 and #2 and the output links #1 and #2) are remaining as available for practical use. That is, only half the total links are available.

Accordingly, there is a need for a test of switching operations which can check operations with respect to any routes (connections) between the input links and the output links without reducing the number of links available for practical use.

SUMMARY OF THE INVENTION

Accordingly, it is a general object of the present invention to provide a device for testing switching operations which can satisfy the need described above.

It is another and more specific object of the present invention to provide a device for testing switching operations which can check operations with respect to any routes (connections) between the input links and the output links without reducing the number of links available for practical use.

In order to achieve the above objects according to the present invention, a device for testing a synchronous-transfer-mode switch which is connected to a plurality of input links and a plurality of output links includes a plurality of test data sending blocks each provided for a corresponding one of the input links and each equipped with a function to set test data in a particular time slot of the corresponding one of the input links, thereby allowing the corresponding one of the input links to convey time slots used for a non-test purpose as well as the particular time slot used for a test, and a plurality of test data receiving blocks each provided for a corresponding one of the output links and each equipped with a function to store data of time slots of the corresponding one of the output links when the time slots of the corresponding one of the output links are used for the test.

In the device described above, a test data sending block can store the test data in any time slot of any input link, and the test data is then extracted from the time slot by a test data receiving block after the time slot containing the test data is switched by the STM switch to be supplied to the test data receiving block. This makes it possible to test the path connecting the test data sending block and the test data receiving block.

In this device, the test data sending blocks and the test data receiving blocks are allocated to each of the existing links, thereby making it possible to test any connections between the input links and the output links.

Further, since no links are dedicated for the sake of the test, the number of links available for practical purposes is not decreased, contrasting to the related art where the number is decreased because some of the links are dedicated for the test use.

According to one aspect of the present invention, the device as described above is such that said test data sending blocks select the particular time slot based on instruction sent from a call-process system.

According to another aspect of the present invention, the device as first described is such that said test data sending blocks select the particular time slot based on instruction sent from one of hardware and software provided on a side of a speech-path system.

According to another aspect of the present invention, the device as first described further includes a table, provided on a side of a speech-path system, which stores a used/unused status of each time slot with respect to each of the input links, the used/unused status of each time slot being updated based on a notice sent from a call-process system, wherein said test data sending blocks select the particular time slot based on said table.

According to another aspect of the present invention, the device as first described further includes a control memory and a time-switch memory, provided with respect to each one of the output links on a side of a speech-path system, said control memory storing write addresses of said time-switch memory at which time slots of the corresponding input links are stored, wherein said control memory includes an additional bit for indicating the used/unused status of the time slots, the used/unused status of each time slot being updated based on a notice sent from a call-process system, wherein said test data sending blocks select the particular time slot based on the additional bit of said control memory.

According to another aspect of the present invention, the device as first described further includes a control memory and a time-switch memory, provided with respect to each one of the output links on a side of a speech-path system, said control memory storing write addresses of said time-switch memory at which time slots of the input links are stored, wherein said control memory stores a specific pattern if a corresponding time slot is an unused time slot, thereby indicating a used/unused status of each time slot, the used/unused status of each time slot being updated based on a notice sent from a call-process system, and wherein said test data sending blocks select the particular time slot based on the used/unused status indicated by said control memory.

According to another aspect of the present invention, the device as first described is such that each of said test data sending blocks includes a register which stores a used/unused status of each time slot with respect to a corresponding one of the input links, each of said test data sending blocks selecting the particular time slot based on the used/unused status stored in said register.

According to another aspect of the present invention, the device as first described further includes a supervising device controlling said test data sending blocks and including a register which stores a used/unused status of each time slot with respect to each of the input links, each of said test data sending blocks selecting the particular time slot based on the used/unused status stored in said register.

According to another aspect of the present invention, the device as first described is such that said test data receiving blocks select time slots having the test data stored therein based on instruction sent from a call-process system, and store the test data of the selected time slots.

According to another aspect of the present invention, the device as first described is such that said test data receiving blocks select time slots having the test data stored therein based on instruction sent from one of hardware and software provided on a side of a speech-path system, and store the test data of the selected time slots.

According to another aspect of the present invention, the device as first described further includes a table, provided on a side of a speech-path system, which stores a used/unused status of each time slot with respect to each of the output links, the used/unused status of each time slot being updated based on a notice sent from a call-process system, wherein said test data receiving blocks select time slots having the test data stored therein based on said table, and store the test data of the selected time slots.

According to another aspect of the present invention, the device as first described further includes a control memory and a time-switch memory, provided with respect to each one of the output links on a side of a speech-path system, said control memory storing write addresses of said time-switch memory at which time slots of the corresponding input links are stored, wherein said control memory includes an additional bit for indicating the used/unused status of the time slots, the used/unused status of each time slot being updated based on a notice sent from a call-process system, wherein said test data receiving blocks select time slots having the test data stored therein based on the additional bit of said control memory, and store the test data of the selected time slots.

According to another aspect of the present invention, the device as first described further includes a control memory and a time-switch memory, provided with respect to each one of the output links on a side of a speech-path system, said control memory storing write addresses of said time-switch memory at which time slots of the input links are stored, wherein said control memory stores a specific pattern if a corresponding time slot is an unused time slot, thereby indicating a used/unused status of each time slot, the used/unused status of each time slot being updated based on a notice sent from a call-process system, and wherein said test data receiving blocks select time slots having the test data stored therein based on the used/unused status indicated by said control memory, and store the test data of the selected time slots.

According to another aspect of the present invention, the device as first described is such that each of said test data receiving blocks includes a register which stores a used/unused status of each time slot with respect to a corresponding one of the output links, each of said test data receiving blocks selecting time slots having the test data stored therein based on the used/unused status stored in said register so as to store the test data of the selected time slots.

According to another aspect of the present invention, the device as first described further includes a supervising device controlling said test data receiving blocks and including a register which stores a used/unused status of each time slot with respect to each of the output links, each of said test data receiving blocks selecting time slots having the test data stored therein based on the used/unused status stored in said register so as to store the test data of the selected time slots.

Other objects and further features of the present invention will be apparent from the following detailed description when read in conjunction with the accompanying drawings.

BRIEF DESCRIPTION OF THE DRAWINGS

FIGS. 9A through 9I are timing charts for explaining operations of the test data sending block;

FIGS. 10A through 10D are illustrative drawings showing examples of a table;

FIGS. 11A through 11E are illustrative drawings for explaining a random-write/sequential-write scheme;

FIGS. 14A through 14G are timing charts for explaining operations of the test data sending block of FIG. 13;

FIGS. 17A through 17E are time charts for explaining operations of the test data receiving block; and FIG. 18 is an illustrative drawing showing a schematic configuration which uses a supervising device.

DESCRIPTION OF THE PREFERRED EMBODIMENTS

In the following, embodiments of the present invention will be described with reference to the accompanying drawings.

Figure 6:
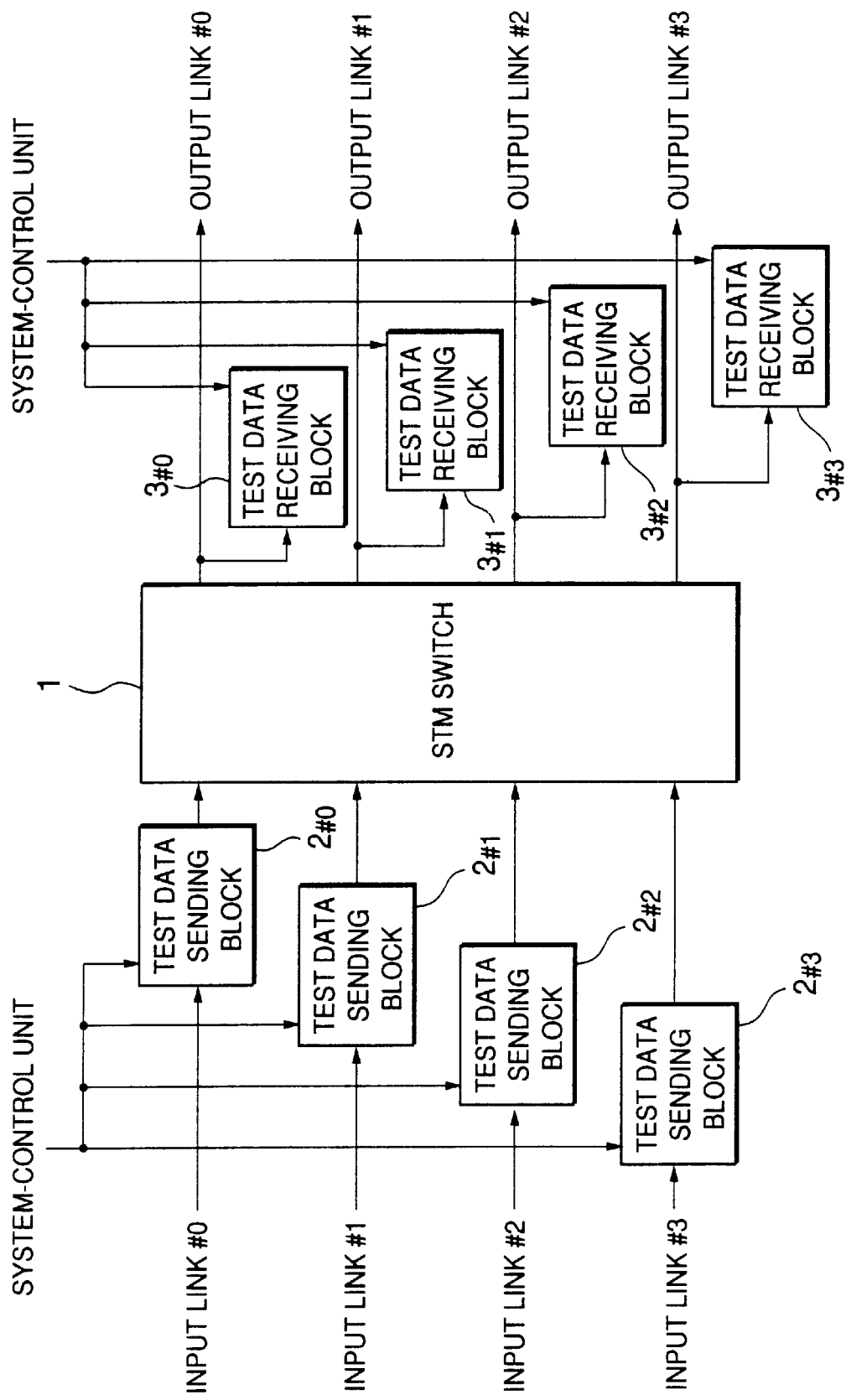
FIG. 6 is an illustrative drawing showing a device for testing an STM switch according to an embodiment of the present invention.
Figure 7:
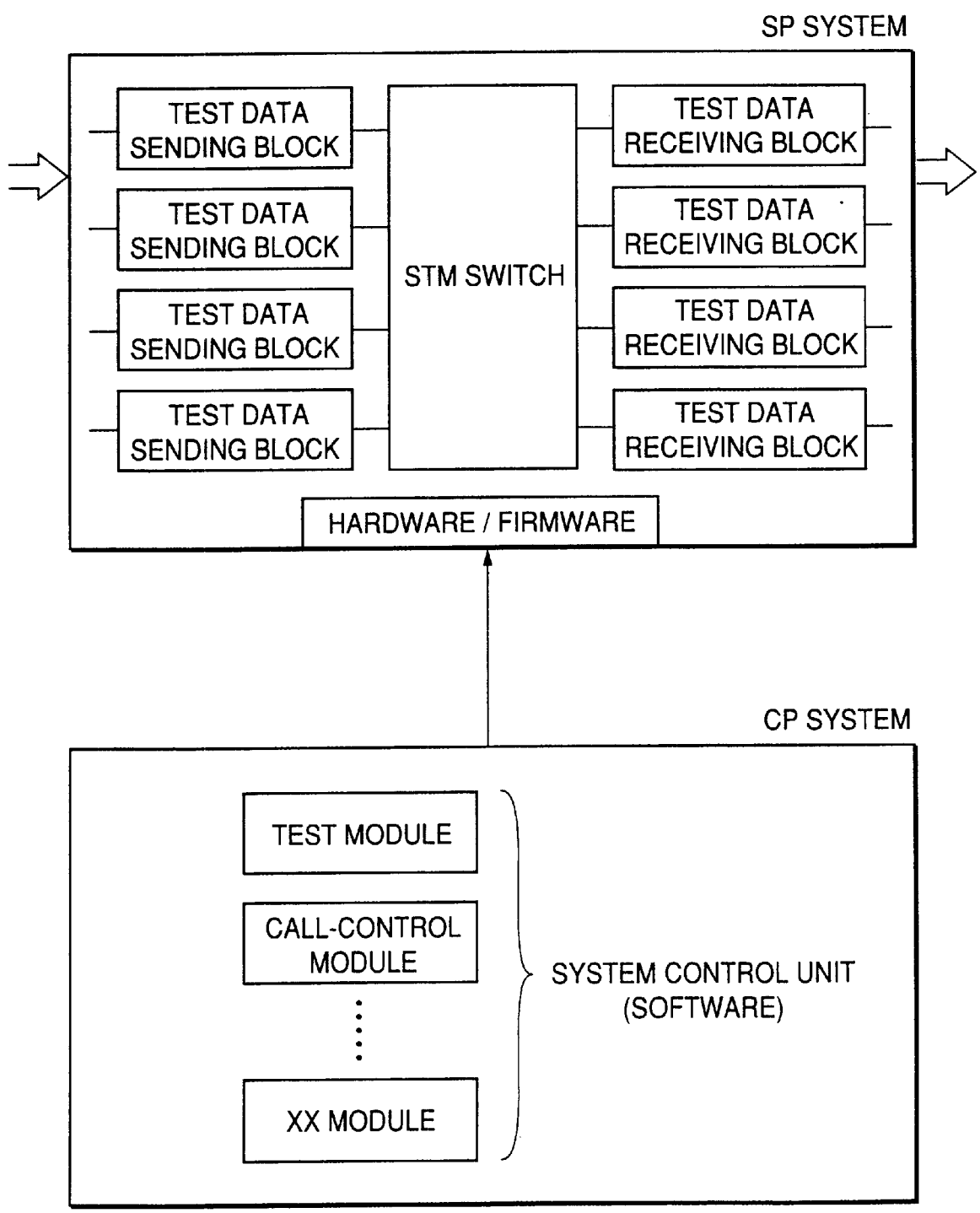
FIG. 7 is an illustrative drawing schematically showing a position of a testing device within a framework of a switching board.
Figure 8:
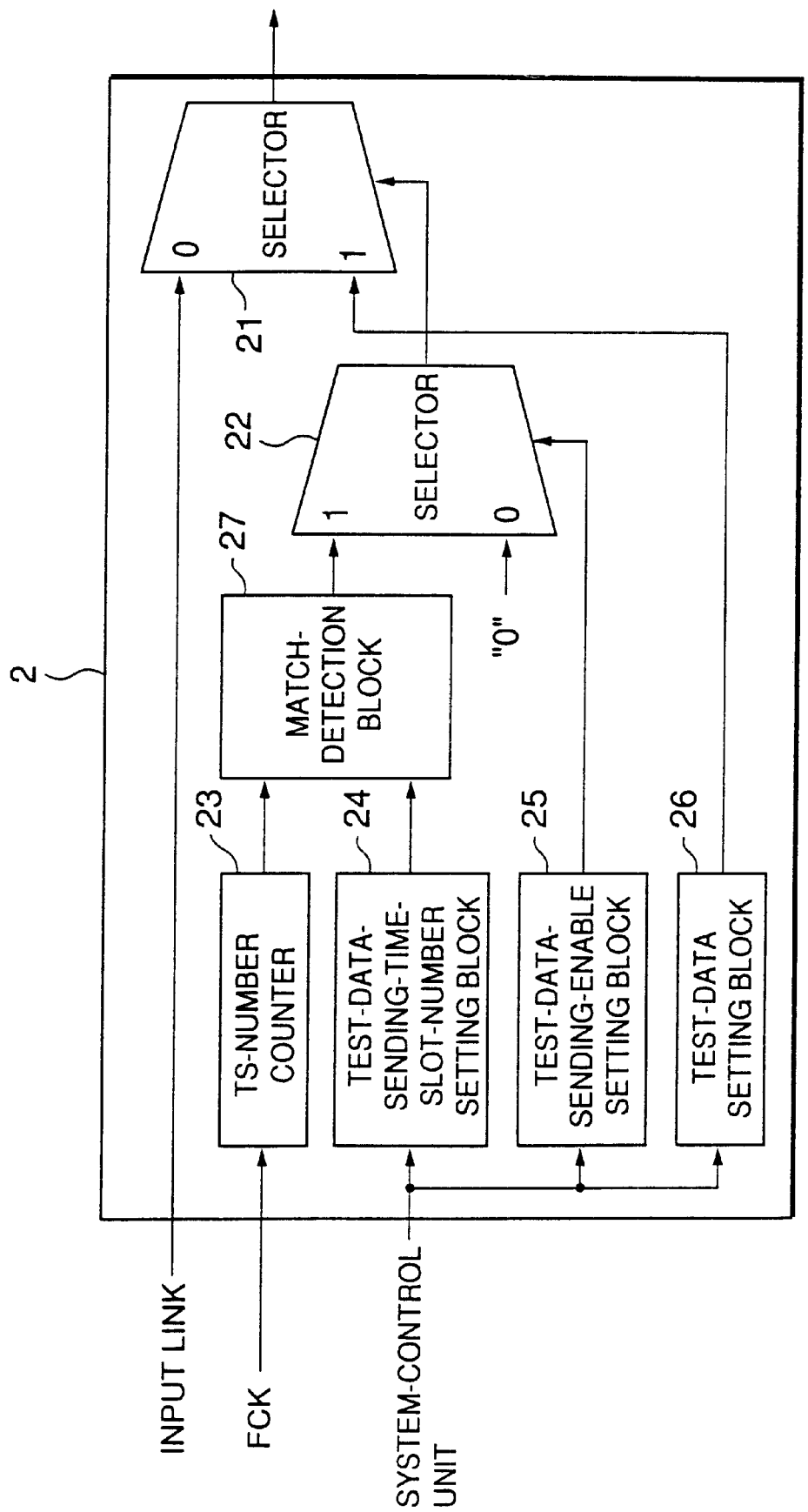
FIG. 8 is an block diagram of a test data sending block of the STEM-switch testing device shown in FIG. 6.

FIG. 6 is an illustrative drawing showing a device for testing an STM switch according to an embodiment of the present invention. FIG. 7 is an illustrative drawing schematically showing a position of the testing device within a framework of a switching board. FIG. 8 is an block diagram of a test data sending block of the STEM-switch testing device shown in FIG. 6. FIGS. 9A through 9I are timing charts for explaining operations of the test data sending block.

As shown in FIG. 7, a switching board includes a call-process system and a speech-path system. In the speech-path system, the STM switch 1 is provided, including a testing device. In the call-process system, a system-control unit is provided. The system-control unit includes a call-control module for issuing various instructions with an aim of controlling the speech-path system by virtue of software control. Further, the system-control unit includes a test module for conducting various tests on the speech paths.

As shown in FIG. 6, the speech-path system includes the STM switch 1 with input links #0 through #3 and output links #0 through #3 connected thereto. Each of the links corresponds to 1024 time slots TS0 through TS1023. The input links #0 through #3 have test data sending blocks $2_{\#0}$ through $2_{\#3}$ installed thereon, respectively, and the output links #0 through #3 have test data receiving blocks $3_{\#0}$ through $3_{\#3}$ installed thereon, respectively. Namely, the test data sending blocks $2_{\#0}$ through $2_{\#3}$ and the test data receiving blocks $3_{\#0}$ through $3_{\#3}$ are distributed in a set of the input/output links #0 through #3. In such a configuration, such a concept as dedicated links for testing purposes (e.g., links #0 and #3 in the related-art example) is obsolete, and test data is transmitted via unused time slots of each link as will be described later.

The test data receiving blocks $3_{\#0}$ through $3_{\#3}$ provided on the output links #0 through #3, respectively, have the same configuration as that described in connection with the related art. Namely, each of the test data receiving blocks $3_{\#0}$ through $3_{\#3}$ stores data of all the time slots TS0 through TS1023 of a corresponding output link.

The test data sending blocks $2_{\#0}$ through $2_{\#3}$ provided on the side of the input links #0 through #3 have a configuration as shown in FIG. 8 according to this embodiment. The test data sending block 2 (one of the test data sending blocks $2_{\#0}$ through $2_{\#3}$) includes a selector 21, a selector 22, a TS-number counter 23, a test-data-sending-time-slot-number setting block 24, a test-data-sending-enable setting block 25, and a match-detection block 27.

The test-data setting block 26 stores test data therein set by the system-control unit; The test-data-sending-time-slot-number setting block 24 stores a time-slot number therein set by the system-control unit when this time-slot number indicates a time slot including the test data. The test-data-sending-enable setting block 25 receives information indicative of whether to send the test data when this information is sent from the system-control unit. Here, this information is 0 when indicating no transmission of the test data, and is 1 when indicating transmission of the test data.

Figure 1:
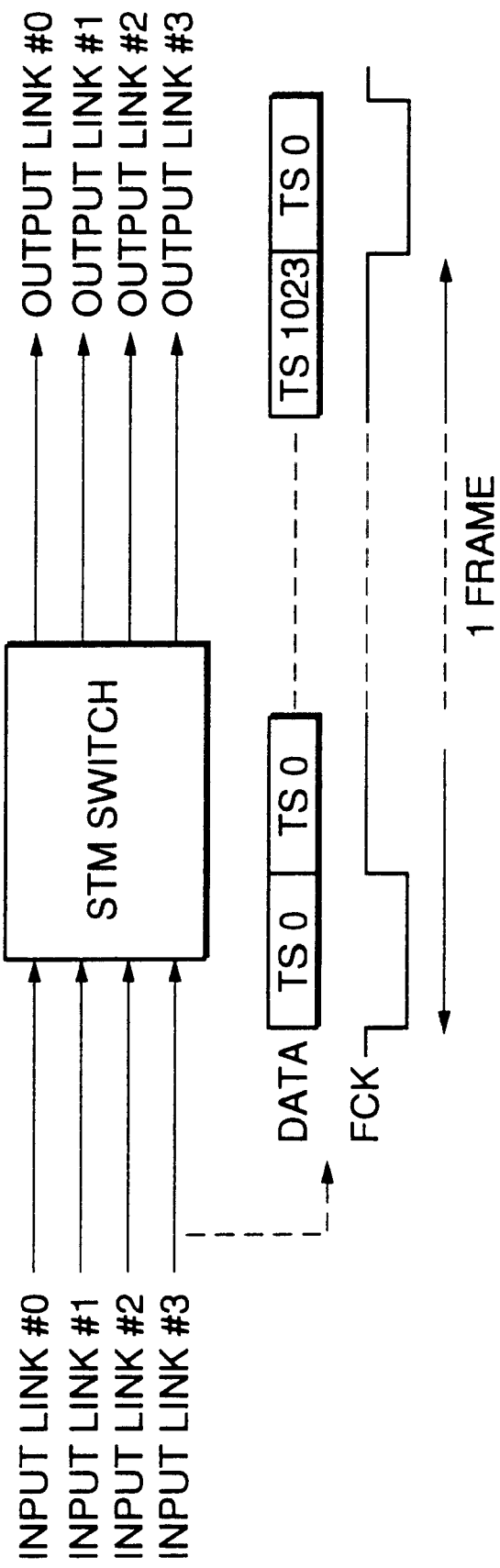
FIG. 1 is an illustrative drawing showing a synchronous-transfer-mode (STM) switch having four input links and four output links.
Figure 2:
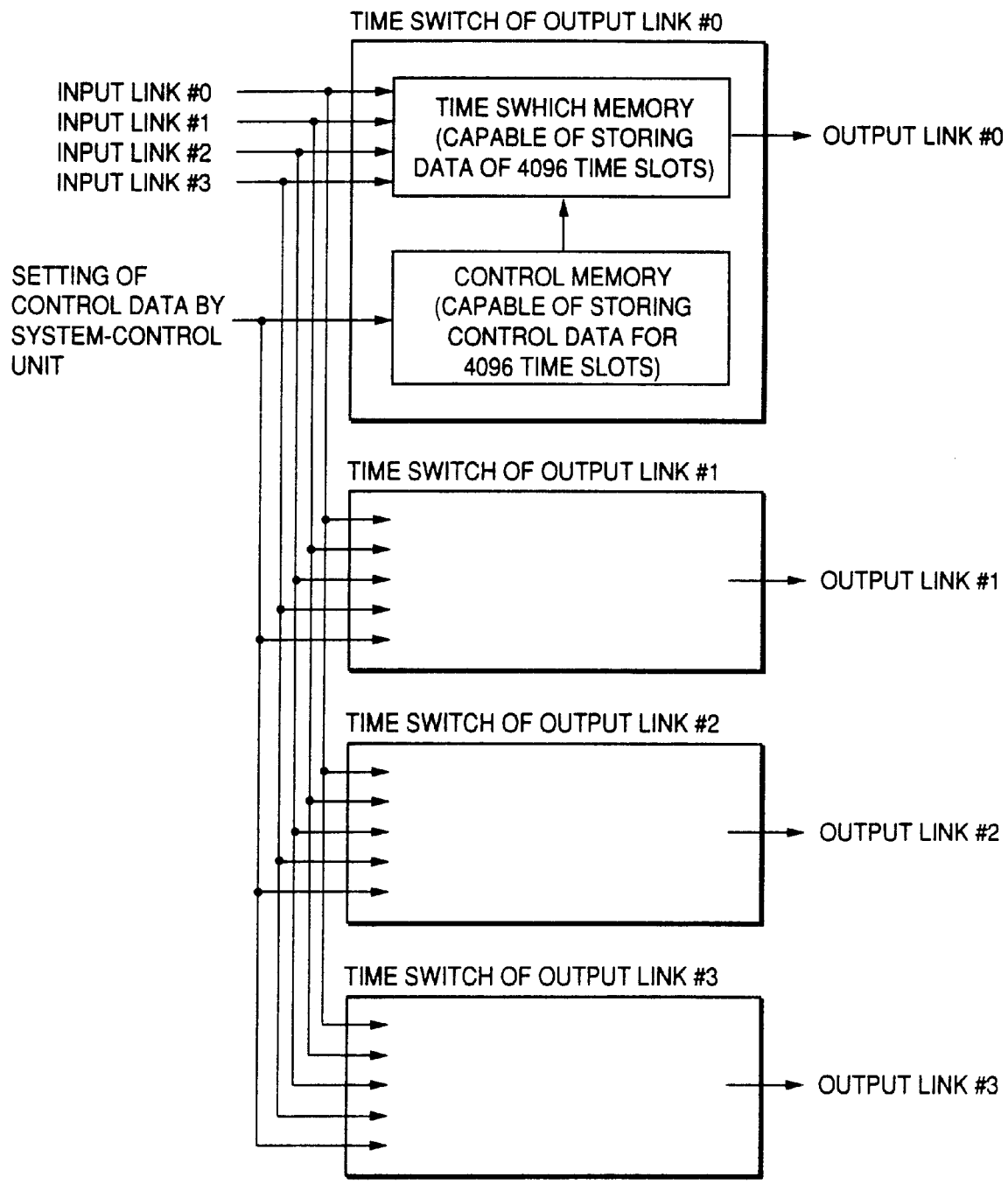
FIG. 2 is an illustrative drawing showing a configuration of the STM switch of FIG. 1.
Figure 3:
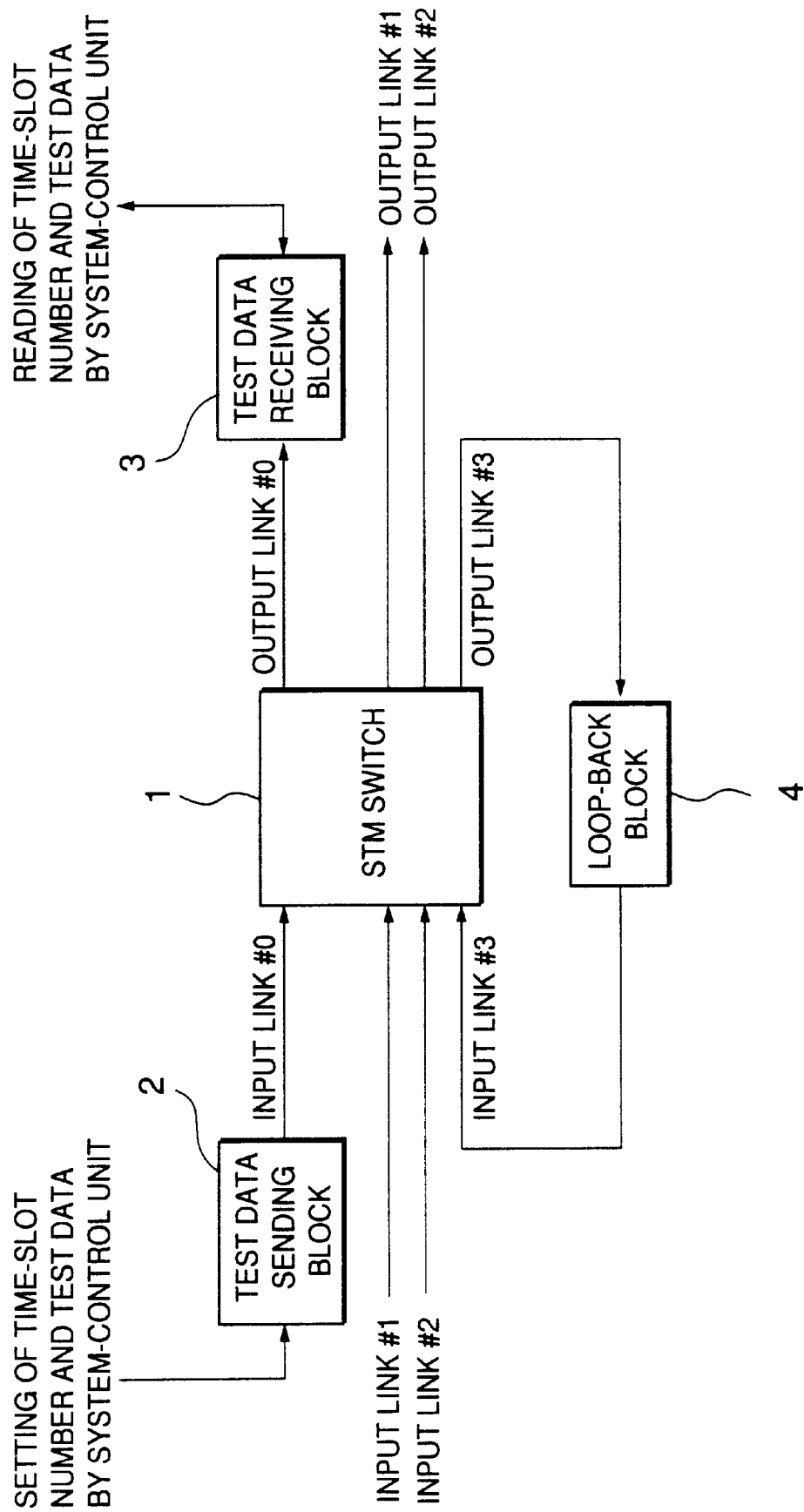
FIG. 3 is an illustrative drawing showing a configuration of a test system used for testing the STM switch.
Figure 4:
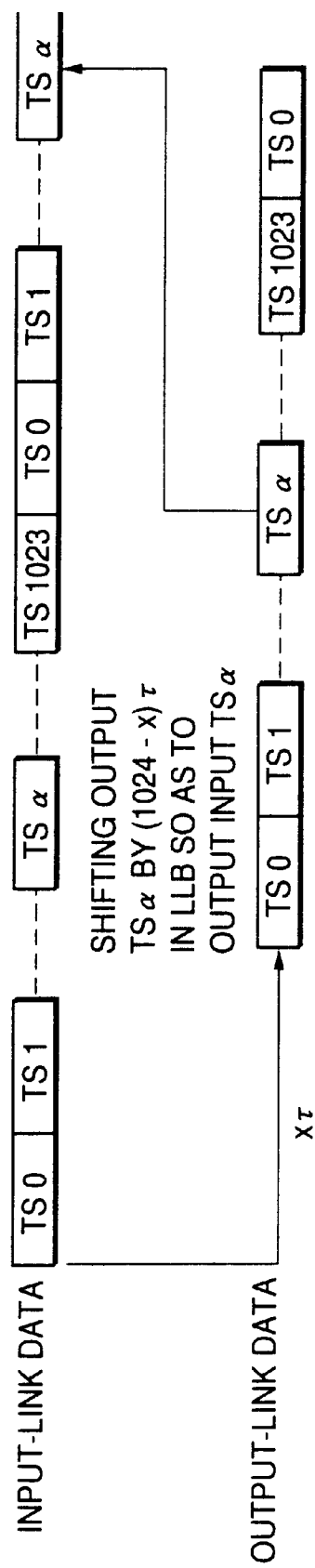
FIG. 4 is an illustrative drawing showing a phase relation between an input link and an output link.
Figure 5:
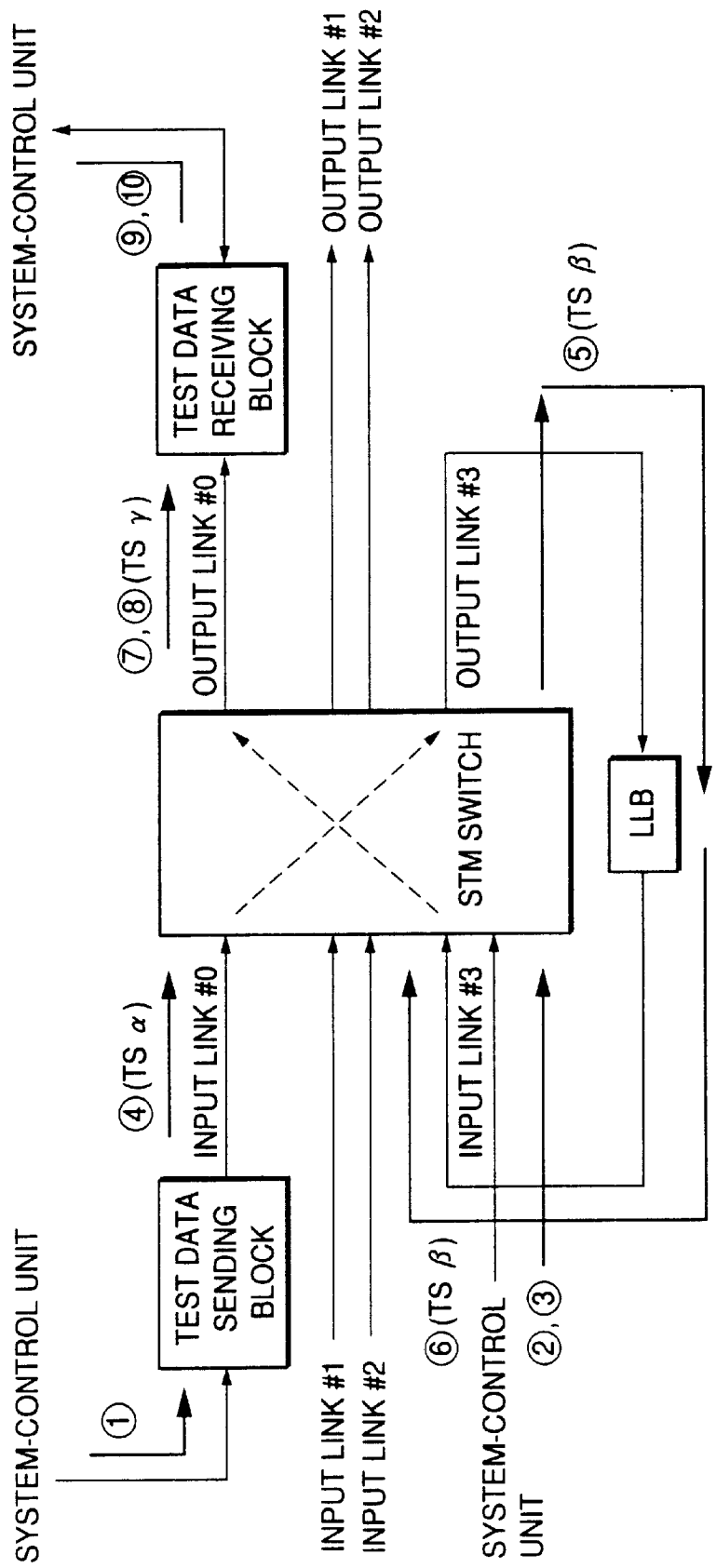
FIG. 5 is an illustrative drawing for explaining a test of switching operations of the STM switch by using the test system of FIG. 3.

The TS-number counter 23 is activated by the frame clock FCK (a signal indicating the beginning of each frame) as shown in FIG. 1, which is input in parallel to the input links. The TS-number counter 23 is designed such that when a time-slot number of a time slot being input from an input link is x, the count of the TS-number counter 23 is also x.

The match-detection block 27 checks whether the time-slot number set in the test-data-sending-time-slot-number setting block 24 corresponds to the count of the TS-number counter 23 (this count indicates the number of time slots input so far). When a match is found, 1 is output. Otherwise, 0 is output.

The selector 22 receives at one input node (node 1) thereof an output signal sent from the match-detection block 27. The other input node (node 0) of the selector 22 receives "0" at all times. A signal output from the test-data-sending-enable setting block 25 is input to the selector 22 as a selection-control signal. When the selection-control signal is "0", the input to the node 0, i.e., data "0", is selected. When the selection-control signal is "1", the input to the node 1, i.e., the output from the match-detection block 27, is selected. A selected signal is then output from the selector 22.

The selector 21 receives data from a corresponding input link at one input node (node 0), and receives the test data from the test-data setting block 26 at the other input node (node 1). When the selection-control signal is "0", the input to the node 0, i.e., the data from the input link, is selected and output. When the selection-control signal is "1", the input to the node 1, i.e., the test data from the test-data setting block 26, is selected and output.

In the test data sending block 2, the output of the selector 22 is 0 when the test-data-sending-enable setting block 25 stores "0". In this case, the selector 21 selects the time-slot data from the input link, so that the test data sending block 2 outputs the time-slot data of the input link.

When the test-data-sending-enable setting block 25 stores "1" indicative of a test operation, the selector 22 selects the output from the match-detection block 27. When the count output of the TS-number counter 23 (i.e., the time-slot number of the current time slot) matches the output of the test-data-sending-time-slot-number setting block 24 (i.e., the time-slot number set for the test purpose), the match-detection block 27 outputs "1". This output is supplied via the selector 22 to the selector 21 as a selection-control signal. In this case, the selector 21 selects the test data stored in the test-data setting block 26. Namely, the test data sending block 2 supplies the test data to the STM switch 1 in response to the time slot having the time-slot number stored in the test-data-sending-time-slot-number setting block 24.

When the count output of the TS-number counter 23 does not match the output of the test-data-sending-time-slot-number setting block 24, the selector 21 receives "0" as the selection-control signal. In this case, the selector 21 selects the data of the input link, so that the test data sending block 2 supplies the time-slot data of the input link to the STM switch 1.

FIGS. 9A through 9I are timing charts for explaining the operations described above. In this example, the test-data-sending-time-slot-number setting block 24 stores time-slot number (n+4) therein set by the system-control unit. At a timing of a time slot TS(n+4), therefore, the selector 21 selects the test data of the test-data setting block 26 instead of the data of the input link, and outputs the selected test data.

A sequence for testing switching operations in the test device of the present embodiment will be described below with reference to an example in which the time slot TSα of the input link #1 is routed through switching operations to be supplied as the time slot TSβ of the output link #2.

1) The system-control unit instructs the test data sending block $2_{\#1}$ of the input link #1 to store a test data pattern A in a time slot TSα and supply it to the STM switch 1 (the time slot TSα is assumed to be unused and available for this test). Namely, the test data pattern A is stored in the test-data setting block 26, and the time-slot number α is stored in the test-data-sending-time-slot-number setting block 24. In addition, the test-data-sending-enable setting block 25 is instructed to store "1" indicative of the test operation.

2) The system-control unit instructs the STM switch 1 (to be exact, the control memory in the STM switch 1 corresponding to the output link #2) that the time slot TSα of the input link #1 be supplied as the a time slot TSβ of the output link #2 via switching operations. In this case, it is required that the time slot TSβ is also unused and available for the test.

3) Because of the process of 1), the test data sending block $2_{\#1}$ of the input link #1 supplies the test data pattern A to the STM switch 1 as the time slot TSα of the input link #1.

4) Because of the process of 2), the test data pattern A is routed through switching operations, and is output from the STM switch 1 as the time slot TSβ of the output link #2.

5) The test data pattern A is then stored in the test data receiving block $3_{\#2}$ of the output link #2 as the time slot TSβ.

6) The system-control unit instructs the test data receiving block $3_{\#2}$ of the output link #2 to output the data of the time slot TSβ.

7) In response to this instruction, the test data receiving block $3_{\#2}$ of the output link #2 outputs the test data pattern A to the system-control unit.

8) The system control unit compares the test data pattern A obtained at the step 7) with the test data pattern A used at the step 1).

9) If there is a match at the step 8), the test is indicating perfectly normal operations. Otherwise, the test is indicating abnormal operations.

In the embodiment described above, a test can be conducted on switching operations with respect to any combinations between input links and output links. Since the test data sending block and the test data receiving block do not require links dedicated for the test purpose, the number of links available for practical use does not decrease.

In application of the present invention, various modifications can be made. A description of these modifications will be provided below.

In the previous embodiment, the time slot which carries the test data along the input/output links of the STM switch 1 needs to be an unused time slot. Because of this requirement, the system-control unit needs to search for an unused time slot before giving an instruction specifying a time-slot number of a time slot which is to carry the test data. This process imposes the load.

In general, software of the system-control unit has a module structure in which various modules such as a call-control module and a test module are provided. The test as described above is, of course, performed by the test module. On the other hand, a check as to whether a given time slot is unused or not is decided by the call-control module. In order to carry through the test as described above, therefore, the test module needs to inquire the call-control module about the availability of unused time slots, and obtains information on the unused time slots in advance. This whole process of obtaining the information becomes a burdensome load in terms of software operation.

In the related art, the test data sending block 2 and the test data receiving block 3 are provided on the dedicated links, and all the time slots on these dedicated links are unused in terms of practical purposes other than for the test. Because of this, there is no need to search for unused time slots in the related art.

Another embodiment of the present invention addresses this problem. In this embodiment, time slots used for the test (i.e., unused time slots) are determined by a test-control unit comprised of firmware/hardware in the speech-path system, rather than determined by the system-control unit. A detailed description of this embodiment will be provided below.

A basic configuration of this embodiment is the same as that shown in FIG. 7 and FIG. 8, except that the system-control unit providing instructions for the test data sending blocks $2_{\#0}$ through $2_{\#3}$ and the test data receiving blocks $3_{\#0}$ through $3_{\#3}$ is replaced by a test-control unit comprised of firmware/hardware in the speech-path system. In this configuration, the system-control unit (the test-control unit to be exact) provides the test-control units with only an input-link number and an output-link number used for the test.

In this embodiment, almost the same procedure as that of the previous embodiment shown in the processes 1) through 9) is performed. The "system-control unit" appearing in the description of the processes 1) through 9) are, of course, replaced by the "test-control unit". The result obtained at the step 9) is sent from the test-control unit to the system-control unit for the notification purpose.

In this embodiment, the link number to be tested is provided from the system-control unit as the procedure proceeds by following the test sequence from. 1) to 9). On the other hand, the time-slot numbers of unused time slots to be used for storing test data need to be determined by the test-control unit. When determining unused time slots, the test-control unit selects unused time slots to be used for the test in an ascending order of slot numbers. Each link in this example is comprised of 1024 time slots TS0 through TS1023. Any time slots which are not used can be utilized for the test purpose. In this embodiment, however, an unused time slot having the lowest slot number is selected and used for the test. As for how to search for the unused time slots, a detailed procedure will be described later with respect to each of an input link and an output link.

In the present embodiment, unused time slots to be used for storing the test data need to be excluded by the system-control unit (i.e., the call-control module) so as not be used for practical-path connection. This can be achieved by one of the two following procedures, for example.

a) When the test-control unit selects an unused time slot to be used for the test purpose, the call-control module of the system-control unit is notified. In response, the call-control module makes sure that this unused time slot is not used for a path connection. After the end of the test, the test-control unit notifies the call-control module of the system-control unit. In response, the call-control module puts this time slot back on a list which specifies the time slots that can be used for path connections.

b) The test module of the system-control unit instructs the test-control unit of the speech-path system to conduct a test, and, at the same time, notifies the call-control module of the input-link/output-link numbers to be tested. In response to a test-completion notification sent from the test-control unit, the test module informs the call-control module of this fact. The call-control module does not use the input link and the output link which are being tested, so that these links are not used for path connections.

In the following, various methods of finding unused time slots to be used for storing test data will be described with respect to a case in which these unused time slots are searched for in the input links.

A) Table Scheme

Availability of each time slot of the input links is reported to the test-control unit (firmware) from the call-control module (software) of the system-control unit in advance without regard to the test operations. The test-control unit stores the availability information in a table form. To report the availability, the following procedure may be used.

The call-control module of the system-control unit sets or releases a path in the control memory of the STM switch 1 with respect to a setting/releasing of each call. At the same time as when this setting/releasing is performed, information such as "making available/unavailable a time slot TSy of an input link #x" is reported to the test-control unit. The test-control unit creates a table based on this information, such that the table shows a used/unused status of all the time slots with respect to each of the input links #0 through #3. FIGS. 10A through 10D are illustrative drawings showing examples of the table.

Upon receiving a test instruction (including an input-link number to be tested), the test-control unit reads the used/unused status of time slots of this input link successively in an ascending order of times-lot numbers by referring to the table of this input link. Then, the first time slot which shows the unused status is selected as the unused time slot to be used for the test.

B) Control-Memory Scheme

Availability of each time slot of the input links is stored in a control memory on an input-link-wise basis. This can be achieved by one of the two following methods, for example.
B-1) Bit-Addition in Control Memory There are various schemes for time switching operations. The control-memory scheme is suitably applied to the random-write/sequential-read scheme among other time switching schemes. The random-write/sequential-read scheme uses a control memory to indicate a write address in a time-switch memory, and performs a sequential read operation in an order of addresses with respect to the time-switch memory.

FIGS. 11A through 11E are illustrative drawings for explaining the random-write/sequential-write scheme. In FIG. 11A, a counter CNT starts counting when being triggered by the frame clock FCK provided in parallel with input time slots. The count of the counter CNT at a particular moment coincides with the time-slot number of the time slot being supplied from the input link. As shown in the figures, when a time slot TSx is supplied to the time-switch memory, the count of the counter CNT is "x", which is supplied to the control memory as a read address. Data read from the address x of the control memory is used as a write address at which the data of the time slot TSx of the input link is written in the time-switch memory. In this manner, addresses of the control memory coincide with the time-slot numbers of the time slots of the input link.

Figure 12:
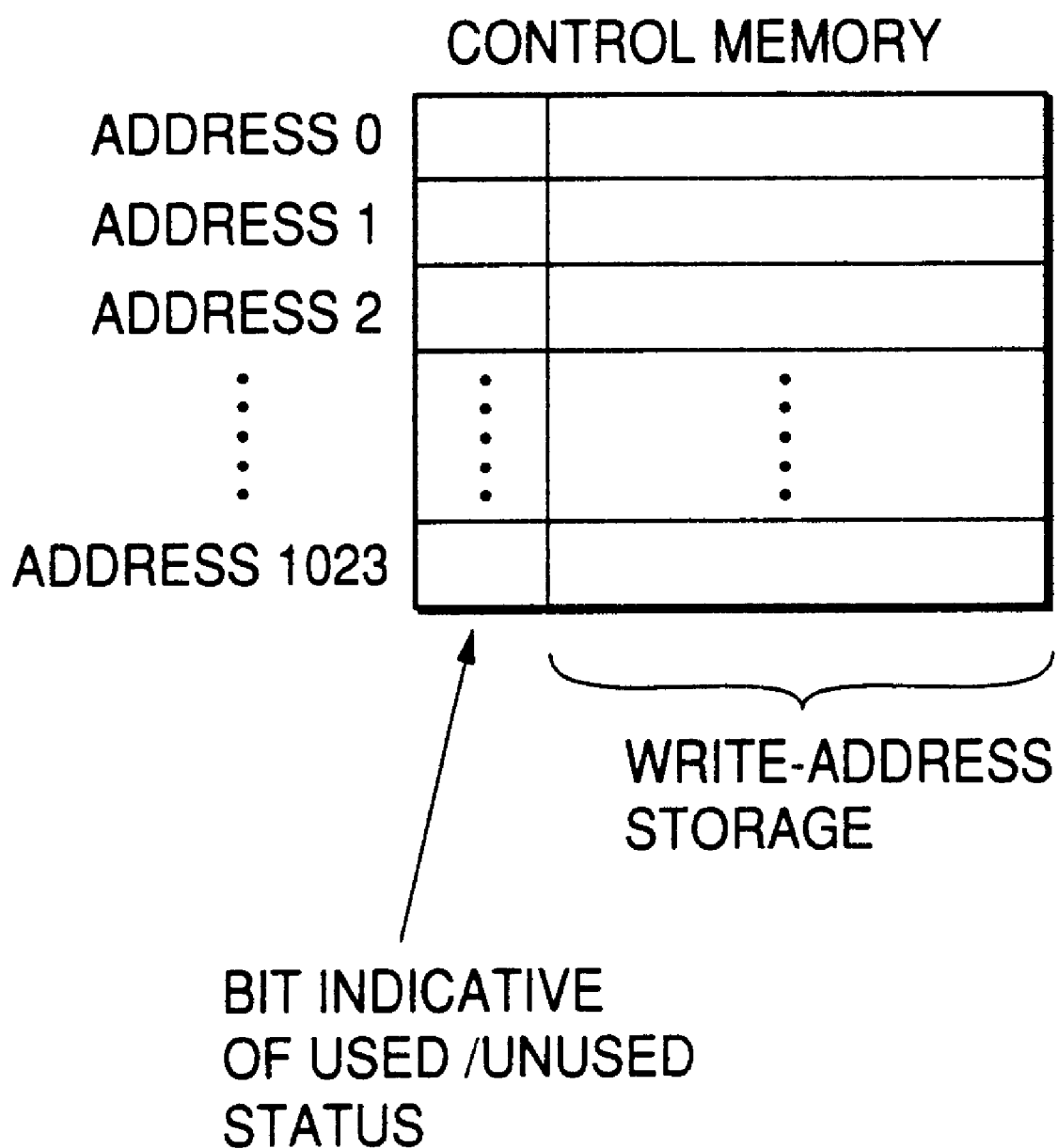
FIG. 12 is an illustrative drawing showing a control memory which is expanded by one bit.

FIG. 12 is an illustrative drawing showing a control memory which is expanded by 1 bit. As shown in FIG. 12, the data width of the control memory is extended by 1 bit, which is used for indicating a used/unused status of the time slot. The call-control module of the system-control unit sets/releases a path in the control memory with respect to setting/releasing of each call. At the same time as when this setting/releasing is performed, a used/unused status is recorded in the added bit. Upon receiving a test instruction from the test module of the system-control unit, the test-control unit reads the contents of the control memory successively in an ascending order of addresses (i.e., an ascending order of time-slot numbers). The first address showing an unused status is identified, and a time slot corresponding to this address is selected as an unused time slot used for a test.

B-2) Special Setting to Control Memory

Another method of recording availability of time slots in a control memory is to set a specific pattern indicative of an unused status of a time slot in the control memory, rather than to extend the data width of the control memory by 1 bit.

Data stored in the control memory is write addresses of the time-switch memory. When a time slot appearing on an input link is an unused time slot in which no data needs to be written, corresponding data stored in the control memory can be any data of any type. According to this scheme, therefore, if the time slot is an unused time slot, data having a specific pattern is stored in the control memory. This specific pattern is, of course, regarded as indicating a particular address of the time-switch memory. This address, however, is prohibited from being used in the call process, and is used for the purpose of indicating unused time slots. A search for an unused time slot is made by trying to find the specific pattern in the control memory.

C) Setting to Test Data Sending Block

Figure 13:
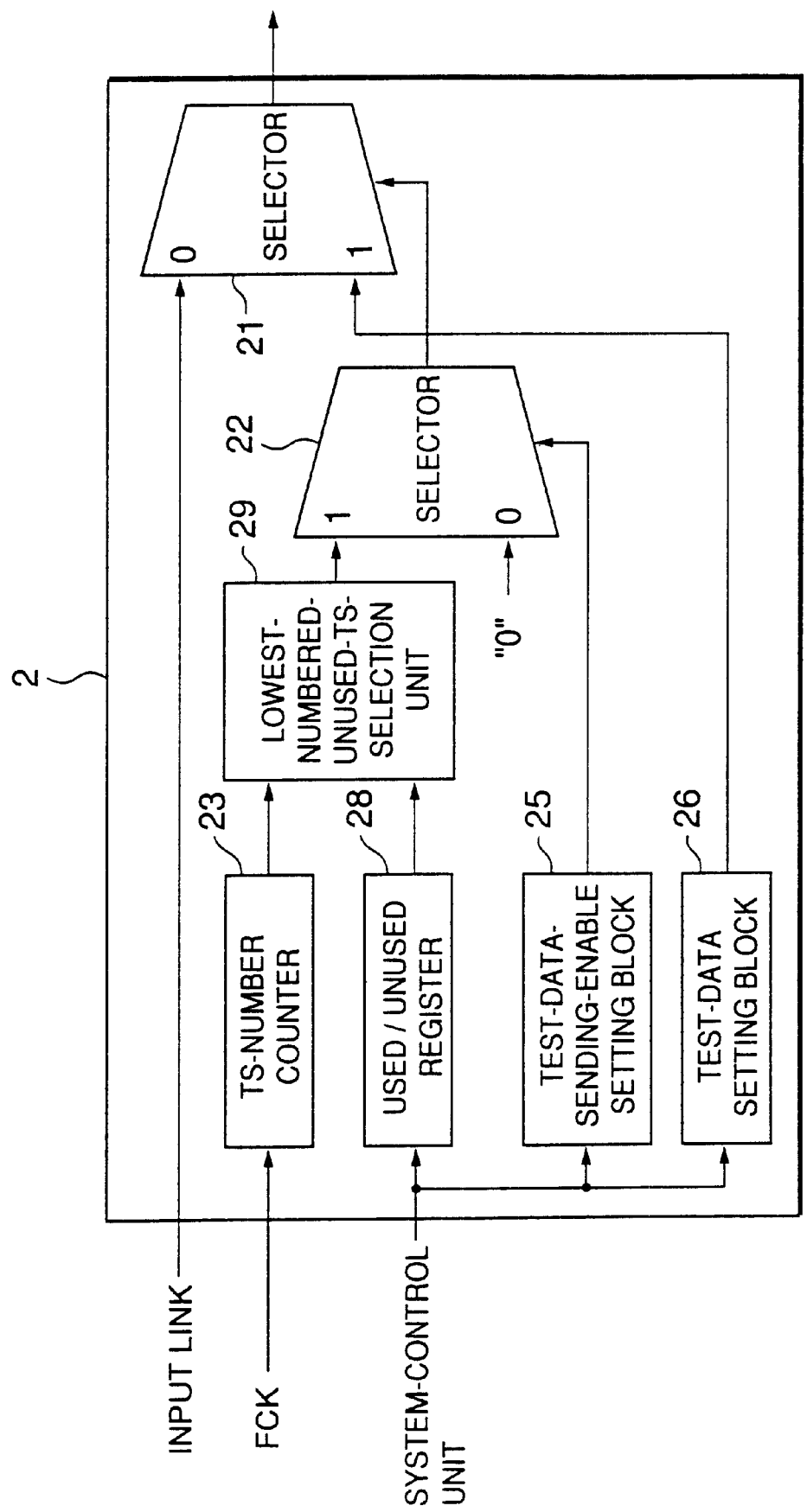
FIG. 13 is a block diagram of a test data sending block according to another embodiment of the present invention.

FIG. 13 is a block diagram of a test data sending block according to another embodiment of the present invention. FIGS. 14A through 14G are timing charts for explaining the operations of the test data sending block.

In this embodiment, availability of all the time slots of each link is stored in the test data sending block 2 by the system-control unit. Namely, rather than adding 1 bit to the control memory to represent a used/unused status of each time slot, a register (memory) is provided in the test data sending block 2, and the call-control module of the system-control unit sets the used/unused status in the register.

The configuration of FIG. 13 bears similarity to the configuration of FIG. 8, and elements having the same name provide the same function. In FIG. 13, a used/unused register 28 stores one bit indicative of a used/unused status with respect to all the time slots of the corresponding input link. The used/unused statuses are set by the call-control module of the system-control unit. In this embodiment, the output of the TS-number counter 23 (i.e., the time-slot number of the current time slot) is supplied to the used/unused register 28. The used/unused register 28 outputs a signal indicative of a used/unused status of a time slot when a time-slot number of this time slot is supplied from the TS-number counter 23 as one of the successively supplied numbers. In this manner, successive outputs of the used/unused register 28 are used as an indication of the used/unused status of respective time slots.

A lowest-numbered-unused-TS-selection unit 29 receives the signal indicative of a used/unused status of a time slot from the used/unused register 28, and outputs a signal which becomes 1 only when a current time-slot number is that of a time slot having the lowest time-slot number among the unused time slots. This signal is supplied to a node 1 of the selector 22. The lowest-numbered-unused-TS-selection unit 29 remains silent when receiving a signal indicative of an unused status if the time slot of this unused status does not have the lowest time-slot number. The lowest-numbered-unused-TS-selection unit 29 serves to prevent the test data from being stored in all the unused time slots of a given one frame.

In this embodiment, the lowest-numbered-unused-TS-selection unit 29 supplies a signal having a value "1" indicative of an unused status to the selector 22 only when the time slot being input from the input link is an unused time slot having the lowest time-slot number. As a result, the selector 21 stores the test data of the test-data setting block 26 in this unused time slot. When unused time slots having other then the lowest time-slot number are supplied, the lowest-numbered-unused-TS-selection unit 29 outputs a signal having a value of "0" to the selector 22. In this case, therefore, the selector 21 selects the time-slot data supplied from the input link, and outputs the same.

In this embodiment, as in the previous embodiment, the test-control unit provided in the speech-path system may be used for giving various instructions, taking over some of roles of the system-control unit.

D) Setting to Device Supervising Test Data Sending Block

Figure 15:
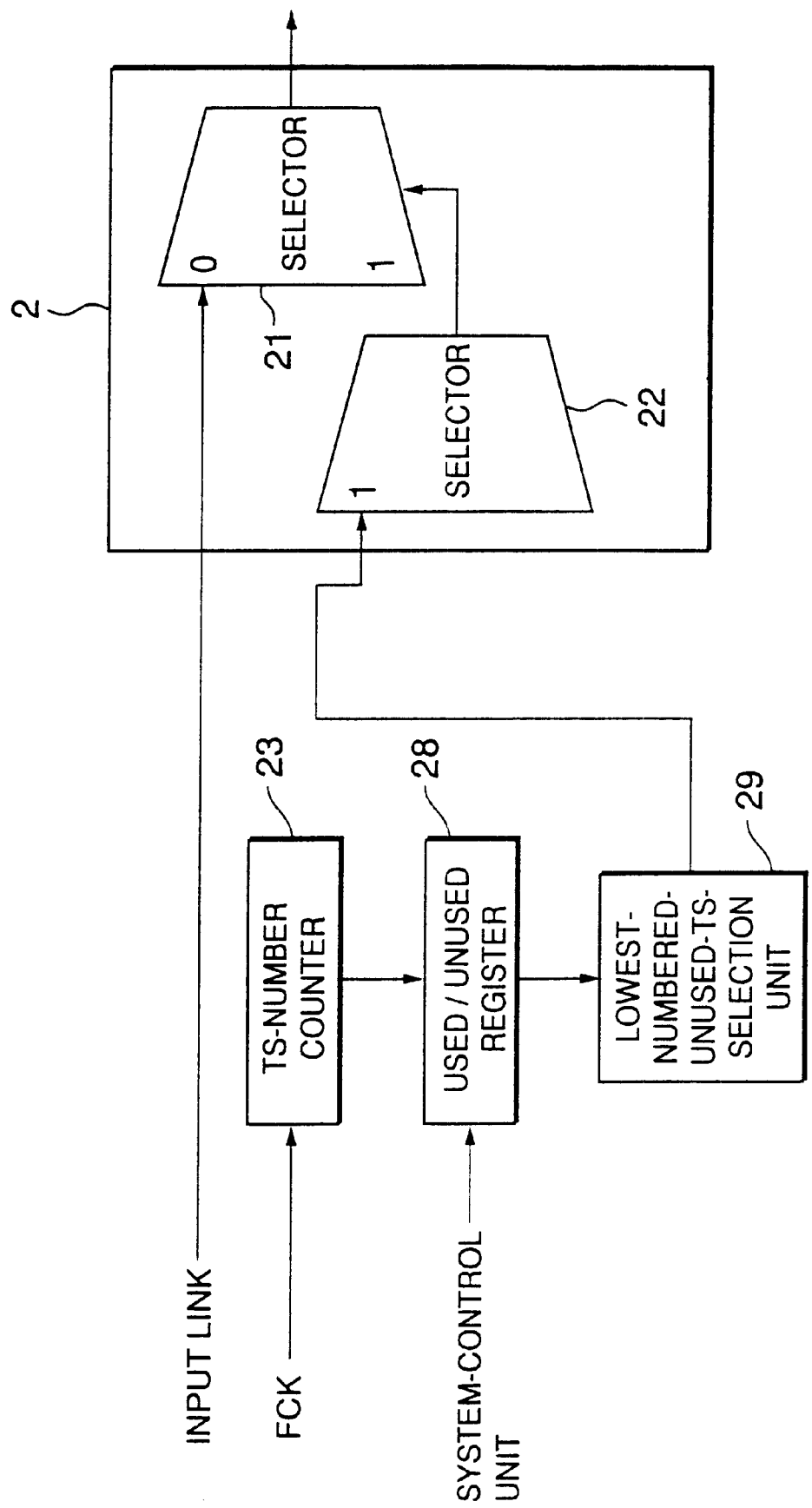
FIG. 15 is a block diagram showing a configuration of another embodiment of the present invention.

FIG. 15 is a block diagram showing a configuration of another embodiment of the present invention.

In this embodiment, availability of all the time slots of each link is set to a supervising device by the system-control unit. The supervising device supplies the availability data to the test data sending block 2 generally in synchronism with the time slots of the input link. As shown in FIG. 15, the TS-number counter 23, the used/unused register 28, and the lowest-numbered-unused-TS-selection unit 29 are provided as elements of the supervising device controlling the test data sending block 2, rather than elements of the test data sending block 2 as shown in FIG. 13. The output signal from the lowest-numbered-unused-TS-selection unit 29 is then supplied to the test data sending block 2 in parallel to the input link, and is thence input to the input node 1 of the selector 22.

In this scheme D), as in the previous embodiment, the test-control unit provided in the speech-path system may be used for giving various instructions, taking over some of roles of the system-control unit.

In what follows, various methods of finding unused time slots of the output links for the test purposes will be described.

A') Table Scheme

Availability of each time slot of the output links is reported to the test-control unit of the speech-path system from the call-control module of the system-control unit. This scheme forms a pair with the table scheme A), which has been described in connection with the search of unused time slots of the input links as illustrated in FIGS. 10A through 10D. In this scheme, a table maintains a used/unused status of all the time slots with respect to each of the output links #0 through #3. The setting of the used/unused statuses in the table is made in the same manner as in the previous embodiment by informing the test-controlling unit of necessary information in response to each setting/releasing of a call by the call-control module. Details are the same as those of the previously described table scheme, and a description thereof will be omitted.

B') Control-Memory Scheme

Availability of each time slot of the output links is stored in a control memory by the call-control module of the system-control unit. This scheme forms a pair with the control-memory scheme B) previously described with respect to the input links. As in the previous example, this may be achieved by one of the two following methods.

B'-1) Bit-Addition in Control Memory

This first method forms a pair with the bit-addition-in-control-memory method B-1) regarding the input links as described with reference to FIG. 12. Bit addition to the control memory on the output-link side is easily applied to time-switching operations based on the sequential-write/random-read scheme. This scheme is, therefore, like the other side of the coin relative to the random-write/sequential-read scheme on the input-link side. Namely, when data is output from an address x of the control memory, this data is used as an address for reading data of a time slot TSx of the output link from the time-switch memory. That is, addresses of the control memory coincide with time-slot numbers of the time slots of the output link. Subsequent processes are the same as the bit-addition scheme as previously described, and a description thereof will be omitted.

B'-2) Special Setting to Control Memory

As in the previous example, the second method sets a specific pattern indicative of an unused status of a time slot in the control memory. This method is suitable when considering application to the time switching operation which is based on the sequential-write/random-read scheme. In this method, data stored in the control memory is read addresses of the times-witch memory. In the case of an unused time slot, corresponding data stored in the control memory can be any data of any type. According to this scheme, therefore, if the time slot is an unused time slot, data having a specific pattern is stored in the control memory by the call-control module. This specific pattern indicates a particular address of the times-witch memory as in the previous example. This address, however, is prohibited from being used in the call process, and is used for the purpose of indicating unused time slots. A search for an unused time slot is made by trying to find the specific pattern in the control memory.

C') Setting to Test Data Receiving Block

Figure 16:
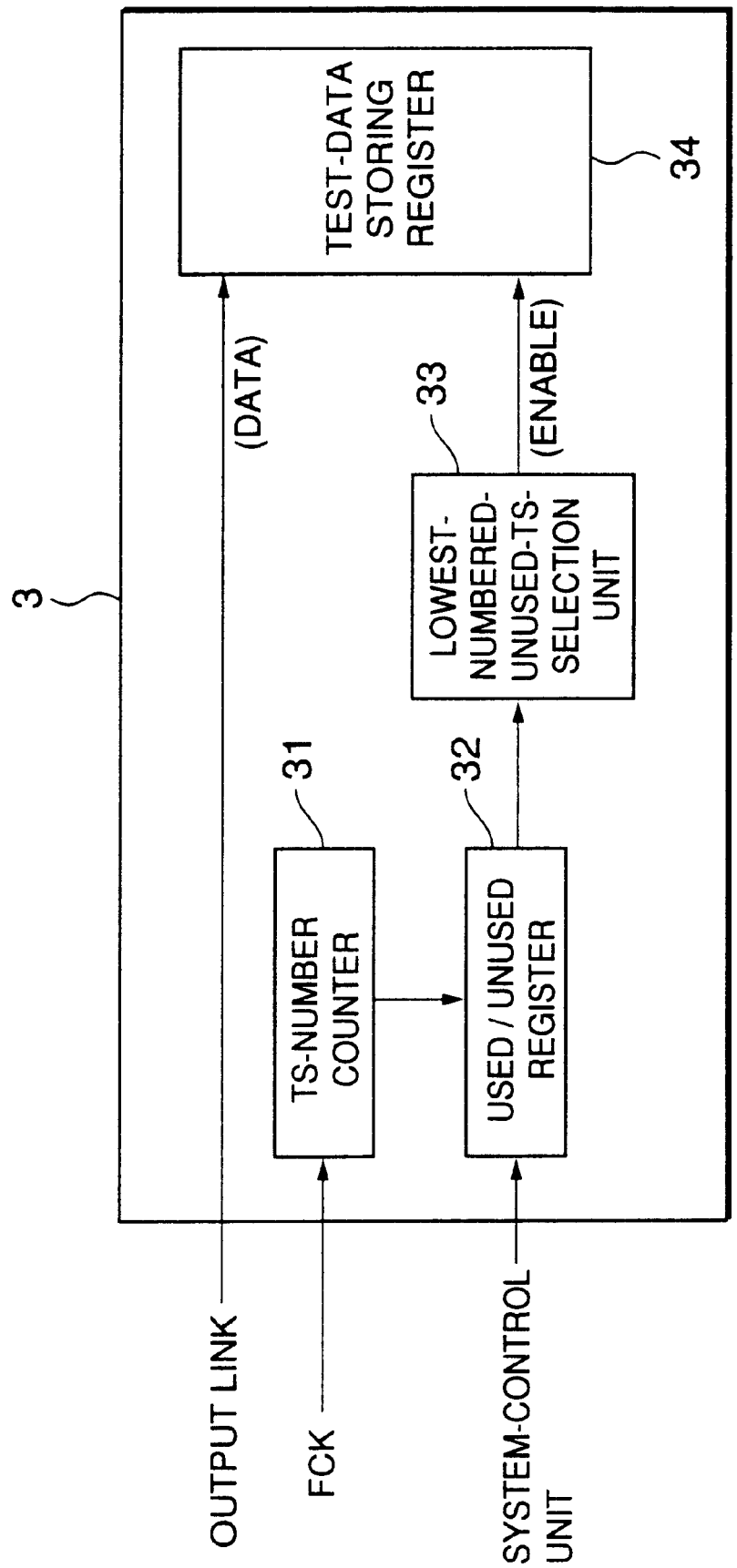
FIG. 16 is an illustrative drawing showing a schematic configuration of a test data receiving block.

In this scheme, availability of all the time slots of each output link is stored in the test data receiving blocks $3_{\#0}$ through $3_{\#3}$ by the call-control module of the system-control unit. This scheme forms a pair with the setting-to-test-data-sending-block scheme C) previously described with reference to FIG. 13. FIG. 16 is an illustrative drawing showing a schematic configuration of the scheme. FIGS. 17A through 17E are time charts for explaining operations of the test data receiving block 3.

In FIG. 16, elements having the same name as those of FIG. 13 have the same functions. That is, a TS-number counter 31 provides the same function as the TS-number counter 23 previously described, and a used/unused register 32 offers the same function as the used/unused register 28 previously described. Also, a lowest-numbered-unused-TS-selection unit 33 has the same function as the lowest-numbered-unused-TS-selection unit 29. A test-data storing register 34 receives data from the output link, and stores data of a time slot of the output link only when receiving a signal having a value "1" indicative of an unused status from the lowest-numbered-unused-TS-selection unit 33. In this manner, storing of data is easily performed with respect to a time slot having a test data therein. This configuration reduces a hardware size of the test data receiving block 3.

In this embodiment, the lowest-numbered-unused-TS-selection unit 33 supplies a signal having a value "1" to the test-data storing register 34 only when the time slot being input from the output link is a time slot having the test data stored therein (i.e., an unused time slot having the lowest time-slot number). As a result, the test-data storing register 34 stores the test data of the unused time slot. When unused time slots having other then the lowest times-lot number are supplied, the lowest-numbered-unused-TS-selection unit 33 outputs a signal having a value of "0". In this case, therefore, the test-data storing register 34 does not store the data of the time slot supplied from the output link.

In this scheme C', as in the previous embodiment, the test-control unit provided in the speech-path system may be used for giving various instructions, taking over some of roles of the system-control unit.

D') Setting to Device Supervising Test Data Receiving Block

In this scheme, a test-data/non-test-data status of all the time slots of each output link is set to a supervising device controlling the test data receiving block, and is supplied in parallel to the time slots of the output links.

FIG. 18 is an illustrative drawing showing a schematic configuration of this scheme.

The used/unused register 32 and the lowest-numbered-unused-TS-selection unit 33 are provided as elements of the supervising device which controls the test data receiving block, rather than being provided as elements of the test data receiving block. The output signal from the lowest-numbered-unused-TS-selection unit 33 is supplied to the test-data storing register 34 in the test data receiving block, such that this output signal serves as a data-storage-enable signal supplied in parallel to data of the output link.

In this scheme D'), as in the previous embodiment, the test-control unit provided in the speech-path system may be used for giving various instructions, taking over some of roles of the system-control unit.

As described above, the present invention makes it possible to conduct a test on switching operations with respect to any combinations between the input links and the output links. Since there is no need to provide a dedicated link for the test purpose, the number of links available for practical use is not decreased because of the test.

Further, the present invention is not limited to these embodiments, but various variations and modifications may be made without departing from the scope of the present invention.

What is claimed is:

1. A device for testing a synchronous-transfer-mode switch which is connected to a plurality of input links and a plurality of output links, comprising:

a plurality of test data sending blocks each provided for a corresponding one of the input links and each equipped with a function to set test data in a particular time slot of the corresponding one of the input links, thereby allowing the corresponding one of the input links to convey time slots used for a non-test purpose as well as the particular time slot used for a test; and a plurality of test data receiving blocks each provided for a corresponding one of the output links and each equipped with a function to store data of time slots of the corresponding one of the output links when the time slots of the corresponding one of the output links are used for the test, wherein each of said test data sending blocks includes a register which stores a used/unused status of each time slot with respect to a corresponding one of the input links, each of said test data sending blocks selecting the particular time slot based on the used/unused status stored in said register.

2. The device as claimed in claim 1, wherein said test data sending blocks select the particular time slot based on instruction sent from a call-process system.

3. The device as claimed in claim 1, wherein said test data sending blocks select the particular time slot based on instruction sent from one of hardware and software provided on a side of a speech-path system.

4. The device as claimed in claim 1, wherein said test data receiving blocks select time slots having the test data stored therein based on instruction sent from a call-process system, and store the test data of the selected time slots.

5. The device as claimed in claim 1, wherein said test data receiving blocks select time slots having the test data stored therein based on instruction sent from one of hardware and software provided on a side of a speech-path system, and store the test data of the selected time slots.

6. A device for testing a synchronous-transfer-mode switch which is connected to a plurality of input links and a plurality of output links, comprising:

a plurality of test data sending blocks each provided for a corresponding one of the input links and each equipped with a function to set test data in a particular time slot of the corresponding one of the input links, thereby allowing the corresponding one of the input links to convey time slots used for a non-test purpose as well as the particular time slot used for a test; and a plurality of test data receiving blocks each provided for a corresponding one of the output links and each equipped with a function to store data of time slots of the corresponding one of the output links when the time slots of the corresponding one of the output links are used for the test, said device further comprising a table, provided on a side of a speech-path system, which stores a used/unused status of each time slot with respect to each of the input links, the used/unused status of each time slot being updated based on a notice sent from a call-process system, wherein said test data sending blocks select the particular time slot based on said table.

7. A device for testing a synchronous-transfer-mode switch which is connected to a plurality of input links and a plurality of output links, comprising:

a plurality of test data sending blocks each provided for a corresponding one of the input links and each equipped with a function to set test data in a particular time slot of the corresponding one of the input links, thereby allowing the corresponding one of the input links to convey time slots used for a non-test purpose as well as the particular time slot used for a test; and a plurality of test data receiving blocks each provided for a corresponding one of the output links and each equipped with a function to store data of time slots of the corresponding one of the output links when the time slots of the corresponding one of the output links are used for the test, said device further comprising a control memory and a time-switch memory, provided with respect to each one of the output links on a side of a speech-path system, said control memory storing write addresses of said time-switch memory at which time slots of the corresponding input links are stored, wherein said control memory includes an additional bit for indicating the used/unused status of the time slots, the used/unused status of each time slot being updated based on a notice sent from a call-process system, wherein said test data sending blocks select the particular time slot based on the additional bit of said control memory.

8. A device for testing a synchronous-transfer-mode switch which is connected to a plurality of input links and a plurality of output links, comprising:

a plurality of test data sending blocks each provided for a corresponding one of the input links and each equipped with a function to set test data in a particular time slot of the corresponding one of the input links, thereby allowing the corresponding one of the input links to convey time slots used for a non-test purpose as well as the particular time slot used for a test; and a plurality of test data receiving blocks each provided for a corresponding one of the output links and each equipped with a function to store data of time slots of the corresponding one of the output links when the time slots of the corresponding one of the output links are used for the test, said device further comprising a control memory and a time-switch memory, provided with respect to each one of the output links on a side of a speech-path system, said control memory storing write addresses of said time-switch memory at which time slots of the input links are stored, wherein said control memory stores a specific pattern if a corresponding time slot is an unused time slot, thereby indicating a used/unused status of each time slot, the used/unused status of each time slot being updated based on a notice sent from a call-process system, and wherein said test data sending blocks select the particular time slot based on the used/unused status indicated by said control memory.

9. A device for testing a synchronous-transfer-mode switch which is connected to a plurality of input links and a plurality of output links, comprising:

a plurality of test data sending blocks each provided for a corresponding one of the input links and each equipped with a function to set test data in a particular time slot of the corresponding one of the input links, thereby allowing the corresponding one of the input links to convey time slots used for a non-test purpose as well as the particular time slot used for a test; and a plurality of test data receiving blocks each provided for a corresponding one of the output links and each equipped with a function to store data of time slots of the corresponding one of the output links when the time slots of the corresponding one of the output links are used for the test, said device further comprising a supervising device controlling said test data sending blocks and including a register which stores a used/unused status of each time slot with respect to each of the input links, each of said test data sending blocks selecting the particular time slot based on the used/unused status stored in said register.

10. A device for testing a synchronous-transfer-mode switch which is connected to a plurality of input links and a plurality of output links, comprising:

a plurality of test data sending blocks each provided for a corresponding one of the input links and each equipped with a function to set test data in a particular time slot of the corresponding one of the input links, thereby allowing the corresponding one of the input links to convey time slots used for a non-test purpose as well as the particular time slot used for a test; and a plurality of test data receiving blocks each provided for a corresponding one of the output links and each equipped with a function to store data of time slots of the corresponding one of the output links when the time slots of the corresponding one of the output links are used for the test, said device further comprising a table, provided on a side of a speech-path system, which stores a used/unused status of each time slot with respect to each of the output links, the used/unused status of each time slot being updated based on a notice sent from a call-process system, wherein said test data receiving blocks select time slots having the test data stored therein based on said table, and store the test data of the selected time slots.

11. A device for testing a synchronous-transfer-mode switch which is connected to a plurality of input links and a plurality of output links, comprising:

a plurality of test data sending blocks each provided for a corresponding one of the input links and each equipped with a function to set test data in a particular time slot of the corresponding one of the input links, thereby allowing the corresponding one of the input links to convey time slots used for a non-test purpose as well as the particular time slot used for a test; and a plurality of test data receiving blocks each provided for a corresponding one of the output links and each equipped with a function to store data of time slots of the corresponding one of the output links when the time slots of the corresponding one of the output links are used for the test, said device further comprising a control memory and a time-switch memory, provided with respect to each one of the output links on a side of a speech-path system, said control memory storing write addresses of said time-switch memory at which time slots of the corresponding input links are stored, wherein said control memory includes an additional bit for indicating the used/unused status of the time slots, the used/unused status of each time slot being updated based on a notice sent from a call-process system, wherein said test data receiving blocks select time slots having the test data stored therein based on the additional bit of said control memory, and store the test data of the selected time slots.

12. A device for testing a synchronous-transfer-mode switch which is connected to a plurality of input links and a plurality of output links, comprising:

a plurality of test data sending blocks each provided for a corresponding one of the input links and each equipped with a function to set test data in a particular time slot of the corresponding one of the input links, thereby allowing the corresponding one of the input links to convey time slots used for a non-test purpose as well as the particular time slot used for a test; and a plurality of test data receiving blocks each provided for a corresponding one of the output links and each equipped with a function to store data of time slots of the corresponding one of the output links when the time slots of the corresponding one of the output links are used for the test, said device further comprising a control memory and a time-switch memory, provided with respect to each one of the output links on a side of a speech-path system, said control memory storing write addresses of said time-switch memory at which time slots of the input links are stored, wherein said control memory stores a specific pattern if a corresponding time slot is an unused time slot, thereby indicating a used/unused status of each time slot, the used/unused status of each time slot being updated based on a notice sent from a call-process system, and wherein said test data receiving blocks select time slots having the test data stored therein based on the used/unused status indicated by said control memory, and store the test data of the selected time slots.

13. A device for testing a synchronous-transfer-mode switch which is connected to a plurality of input links and a plurality of output links, comprising:

a plurality of test data sending blocks each provided for a corresponding one of the input links and each equipped with a function to set test data in a particular time slot of the corresponding one of the input links, thereby allowing the corresponding one of the input links to convey time slots used for a non-test purpose as well as the particular time slot used for a test; and a plurality of test data receiving blocks each provided for a corresponding one of the output links and each equipped with a function to store data of time slots of the corresponding one of the output links when the time slots of the corresponding one of the output links are used for the test, said device wherein each of said test data receiving blocks includes a register which stores a used/unused status of each time slot with respect to a corresponding one of the output links, each of said test data receiving blocks selecting time slots having the test data stored therein based on the used/unused status stored in said register so as to store the test data of the selected time slots.

14. A device for testing a synchronous-transfer-mode switch which is connected to a plurality of input links and a plurality of output links, comprising:

a plurality of test data sending blocks each provided for a corresponding one of the input links and each equipped with a function to set test data in a particular time slot of the corresponding one of the input links, thereby allowing the corresponding one of the input links to convey time slots used for a non-test purpose as well as the particular time slot used for a test; and a plurality of test data receiving blocks each provided for a corresponding one of the output links and each equipped with a function to store data of time slots of the corresponding one of the output links when the time slots of the corresponding one of the output links are used for the test, said device further comprising a supervising device controlling said test data receiving blocks and including a register which stores a used/unused status of each time slot with respect to each of the output links, each of said test data receiving blocks selecting time slots having the test data stored therein based on the used/unused status stored in said register so as to store the test data of the selected time slots.

* * * * *